Aug. 15, 1967 S. R. OVSHINSKY 3,336,484

POWER SWITCHING CIRCUIT

Filed April 10, 1964 2 Sheets-Sheet 1

INVENTOR
STANFORD R. OVSHINSKY
by: Wallenstein, Spangenberg & Hattis
ATTYS.

INVENTOR
STANFORD R. OVSHINSKY
by: Wallenstein, Spangenberg & Hattis ATTYS.

3,336,484
POWER SWITCHING CIRCUIT

Stanford R. Ovshinsky, Birmingham, Mich., assignor, by mesne assignments, to Energy Conversion Devices, Inc., Troy, Mich., a corporation of Delaware Filed Apr. 10, 1964, Ser. No. 358,841
16 Claims. (Cl. 307—88.5)

This application is a continuation-in-part of copending applications Ser. No. 118,642, filed June 21, 1961, and abandoned; Ser. No. 226,843, filed Sept. 28, 1962, and forfeited; Serial No. 252,510, filed Jan. 18, 1963, now abandoned; Ser. No. 252,511, filed Jan. 18, 1963, and forfeited; Ser. No. 252, 467, filed Jan. 18, 1963, now abandoned; Ser. No. 288,241, filed June 17, 1963, and abandoned; and Ser. No. 310,407, filed Sept. 20, 1963, now U. S. Patent No. 3,271,591, granted Sept. 6, 1966.

This invention relates to the switching of power between a source of alternating current (A.C.) voltage and a load through semiconductor switching means.

The use of a mechanical switch for opening and closing a circuit to control the coupling of power from a source of A.C. voltage to a load is undesirable from a number of standpoints. For example, the opening of the switch causes contact arcing which reduces the life of the switch and circuits carrying appreciable current require bulky and costly contact elements. These disadvantages of mechanical switches are well known and, for this reason, semiconductor switch devices, such as silicon control rectifier (SCR) devices have come into common use for switching both D.C. and A.C. circuits. Since SCR devices are uni-directional devices (i.e., they pass current in only one direction), a pair of such devices connected back-to-back are used in A.C. circuits so that paths for current flow in both directions are provided. In recent years, there has been developed a two-terminal 5-layer semiconductor diode which is capable of passing current in both directions. All of these semiconductor devices have the disadvantage that they are relatively expensive and so they do not have practical use as power control devices in low cost mass produced articles such as toasters, coffeemakers, irons, etc. Also, some of these semiconductor devices require complex control circuitry and have frequency and voltage requirements which do not make them practical in 110–120 volt, 60 cycle per second commercial power circuits.

One of the objects of the invention is to provide a unique power switching system which uses semiconductor devices to switch the main load current in the circuit and which is of such simple and economical design that it costs only a fraction of the cost of semiconductor or mechanical power switching systems heretofore developed. A related object of the invention is to provide a power switching system as described which is operable over a wide range of frequencies and voltages including most particularly 60 cycle per second, 110 volt systems.

Another object of the invention is to provide a unique power switching system as described which controls the limits of variables (such as temperature, moisture, pressure, etc.) by controlling the coupling of power to a load device such as a heater coil, compressor, pump or the like.

The present invention makes use of a newly developed bi-directional semiconductor device referred to as a threshold semiconductor device. This device is disclosed in patent application No. 310,407 and is referred to therein as a "Mechanism" device.

This invention utilizes a pair of two-terminal threshold semiconductor devices or one three-terminal threshold semiconductor device as a power switching means. Various forms of control to be described are used with such threshold semiconductor devices to make them an exceedingly practical and inexpensive power switching means for a variety of applications.

The threshold semiconductor device is a one-layer type semiconductor device having substantially identical conduction characteristics for positive and negative applied voltages. The device initially presents a very high resistance under an applied voltage of any polarity below an upper threshold level and a very low resistance under an applied voltage of any polarity which exceeds an upper threshold level, the change from the high to the low resistance condition occurring substantially instantaneously. The threshold semiconductor device automatically resets itself substantially instaneously to its high resistance state when the current therethrough drops below a holding current level near zero or the RMS value of the applied voltage drops below a lower threshold voltage level. By varying the semiconductor composition or the treatment thereof, the upper and lower threshold levels and the blocking or leakage resistance thereof is readily varied. Blocking resistance values of the order of from one to ten megohms and higher are readily obtainable, as well as somewhat lower blocking resistance value.

One important characteristic of these threshold semiconductor devices is that they are useful as power switching elements in 60 cycle per second, 110 volt circuits (as well as circuits operating at other frequencies and voltages). Moreover, the threshold semiconductor device and the circuitry necessary to effect control thereover can be made for a fraction of the cost of conventional semiconductor power switching systems and, in many cases, for a fraction of the cost of mechanical switching systems.

In accordance with this invention, either one or two threshold semiconductor devices are utilized providing two layers or sections of bi-directional semiconducting material each having the characteristics above described and wherein portions of such sections or layers of semiconductor material are bonded or secured to a pair of main load terminals connected between the source of applied voltage and a load and other portions thereof are electrically joined by means forming an intermediate control terminal means. In the case where a pair of two-terminal threshold semiconductor devices are utilized, the intermediate control terminal means include one terminal of each device electrically connected together and the main load terminals would be the other terminals of the devices. Where a single three-terminal threshold semiconductor device is utilized, two layers of semiconductor material may be located on opposite sides of a permanently conductive body or layer with the main load terminals being electrodes on opposite sides of the device and the control terminal means being the conductive body or layer. Alternatively, a single layer of semiconductor material may form the two sections of semiconductor material referred to. In such case, the main load terminals would be spaced electrodes on one side of the single layer of semiconductor material and the control terminal means would be an electrode or body of conductive material electrically extending along the opposite side of the layer of semiconductor material. The sections of the single layer opposite the spaced electrodes act as two series connected layers of semiconductor material since current will flow from one of the electrodes through the layer to the body of conductive material on the opposite side thereof and then back through the layer to the other electrode.

In the present invention the sum of the upper threshold voltage levels of the two layers or sections of semiconductor material is greater than the value of the applied voltage and, in several forms of the invention to be described, the applied voltage is greater than the upper threshold voltage levels of each section or layer of semiconductor material. A control circuit is provided for controlling the states or conditions of the sections or layers of semiconductor material, the control circuit extending between one of the main load terminals and the intermediate control terminal means so that one of the sections or layers is in parallel with the control circuit and the other is in series therewith. The control circuit has an impedance substantially greater than the conducting impedance of the parallel connected section or layer of semiconductor material so that during the conduction thereof little current or power is drawn by the control circuit. In one form of the invention, when the parallel connected section or layer of semiconductor material is in a non-conducting state or condition, the impedance of the control circuit to initiate conduction of the series connected section or layer of semiconductor material is substantially less than the blocking impedance of such section or layer and is of such a low value that the voltage applied to the series connected section or layer of semiconductor material will be at or above the upper threshold voltage level thereof to drive the same into its conductive state or condition. Once the series connected section or layer of semiconductor material is driven into its conductive state or condition, the impedance of the control circuit relative to the load impedance will be such that the voltage drop in the control circuit exceeds the upper threshold level of the parallel connected section or layer of semiconductor material to drive the same into its conductive state or condition.

The conductive state or condition of the section or layer of semiconductor material is terminated by increasing the impedance of the control circuit to a point which will not support conduction of the series connected section or layer of semiconductor material. As the latter section or layer of semiconductor material becomes non-conducting, current will also be interrupted to the parallel connected semiconductor material causing it to revert to its blocking state or condition. Control over the impedance of the control circuit can be achieved by placing a switch in series with a fixed impedance having the value required to render the sections or layers of semiconductor material conductive in the manner explained above. So the closing of the switch will render the sections or layers of semiconductor material conductive to couple power to the load and opening of the switch will render the sections or layers of semiconductor material non-conductive to disconnect power to the load.

In accordance with a specific aspect of the present invention, the power switching circuit of the invention is designed to control the limits of a variable. In such case, energization of the load will increase or decrease the value of the variable as in the case where the load is a heater coil for a heating system, a compressor for a cooling system, or a pump for a pressure system. Where energization of the load increases the value of the variable, the control circuit is provided with a variable responsive impedance with a positive coefficient and where energization of the load decreases the value of the variable, the control circuit has a variable responsive impedance with a negative coefficient. As energization of the load causes the variable involved to reach a first limiting value, the control circuit impedance will increase to a point where conduction of the sections or layers of semiconductor material ceases and as the resultant de-energization of the load causes the variable to reach an opposite limit the value of the control circuit impedance drops to a value where conduction of the sections or layers of semiconductor material is initiated.

The above and other forms of the invention will be fully understood by making reference to the specifications to follow, the claims and drawings, wherein:

Figures 1, 2, 2A, 2B:
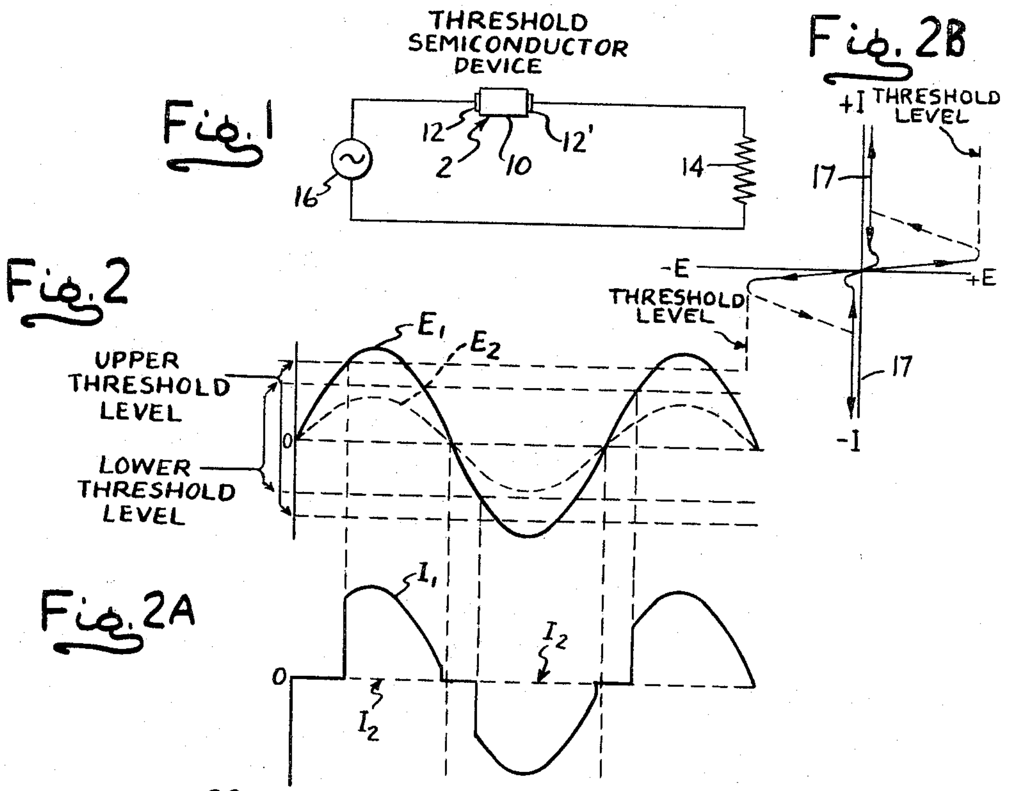
FIG. 1 shows a single two-terminal threshold semiconductor device, in circuit with a source of A.C. voltage and a load to illustrate the manner of operation of a threshold semiconductor device in a generalized circuit not involving the present invention.
FIGS. 2 and 2A show exemplary voltage and current waveforms in the circuit of FIG. 1.
FIG. 2B shows the voltage-current characteristic of the semiconductor device of FIG. 1.

For an understanding of the construction and modes of operation of a threshold semiconductor device, reference should now be made to FIGS. 1, 2 and 2A. FIG. 1 illustrates a typical simple load circuit for a threshold semiconductor device used in the present invention. The device has a body 10 which may take a variety of forms and includes as a surface film or as an entire body or as a part thereof, an active bi-directional semiconductor material having very unique and advantageous properties to be described. The body 10 has a pair of electrodes 12—12' electrically connecting the same with a load 14 and a source of voltage 16. In the present invention the source of voltage 16 will be a source of A.C. voltage which may have a sinusoidal waveform. The load 14 is illustrated in FIG. 1 as a resistance and the operation of the threshold semiconductor device will first be described having such a resistive load.

The threshold semiconductor device is symmetrical in its operation and contains non-rectifying active solid state semiconductor materials and electrodes in non-rectifying contact therewith for controlling the current flow therethrough substantially equally in either or both directions. In their high resistance or blocking conditions these materials may be crystalline like materials or, preferably, materials of the polymeric type including polymeric networks and the like having covalent bonding and crosslinking highly resistant to crystallization, which are in a locally organized disordered solid state condition which is generally amorphous (not crystalline) but which may possibly contain relatively small crystals or chains or ring segments which would probably be maintained in randomly oriented position therein by the crosslinking. These polymeric structures may be one, two or three dimensional structures. While many different materials may be utilized, for example, these materials can be tellurides, selenides, sulfides or oxides of substantially any metal, or metalloid, or intermetallic compound, or semiconductor or solid solutions or mixtures thereof, particularly good results being obtained where tellurium or selenium are utilized.

It is believed that the cooperating materials (metals, metalloids, intermetallic compounds or semiconductors), which may form compounds, or solid solutions or mixtures with the other materials in the solid state semiconductor materials operate, or have a strong tendency to operate, to inhibit crystallization in the semiconductor materials, and it is believed that this crystallization inhibiting tendency is particularly pronounced where the percentages of the materials are relatively remote from the stoichiometric and eutectic ratios of the materials, and/or where the materials themselves have strong crystal inhibiting characteristics, such as, for example, arsenic, gallium and the like. As a result, where, as here, the semiconductor materials have strong crystallization inhibiting characteristics, they will remain or revert to their highly disordered or generally amorphous state.

The following are specific examples of some of the semiconductor materials which have given satisfactory results in a threshold semiconductor device (the percentages being by weight):

25% arsenic and 75% of a mixture 90% tellurium and 10% germanium; also, with the addition of 5% silicon;
75% tellurium and 25% arsenic;
71.8% tellurium, 14.05% arsenic, 13.06% gallium and the remainder lead sulfide;
72.6% tellurium, 14.2% arsenic and 13.2% gallium;
72.6% tellurium, 27.4% gallium arsenide;
85% tellurium, 12% germanium and 3% silicon;
50% tellurium, 50% gallium;
67.2% tellurium, 25.3% gallium arsenide and 7.5% n-type germanium;
75% tellurium and 25% silicon;
75% tellurium and 25% indium antimonide;
55% tellurium and 45% germanium;
45% tellurium and 55% germanium;
75% selenium and 25% arsenic;
57.4% tellurium, 6.4% germanium, 21.2% arsenic, and 15.0% silicon;
87% tellurium and 13% aluminum;
90% tellurium and 10% aluminum;
86% tellurium, 13% aluminum, and 1% selenium;
50% tellurium, and 50% aluminum;
50% aluminum telluride and 50% indium telluride; and
50% aluminum telluride and 50% gallium telluride.

In forming the solid state semiconductor materials, the materials may be ground in an unglazed porcelain mortar to an even powder consistency and thoroughly mixed. They then may be heated in a sealed quartz tube to above the melting point of the material which has the highest melting point. The molten materials may be cooled in the tube and then broken or cut into pieces, with the pieces ground to proper shape to form the bodies 10, or the molten materials may be cast from the tube into preheated graphite molds to form the bodies. The initial grinding of the materials may be done in the presence of air or in the absence of air, the former being preferable where considerable oxides are desired in the ultimate bodies 10. Alternatively, in forming the bodies 10, it may be desirable to press the mixed powdered materials under pressures up to at least 1000 p.s.i. until the powdered materials are completely compacted, and then the completely compacted materials may be appropriately heated.

In some instances it has been found, particularly where arsenic is present in the bodies 10 formed in the foregoing manner, that the bodies are in a disordered or generally amorphous solid state, the high resistance or blocking state or condition. In such instances, bare electrodes can be and have been embedded in the bodies during the formation thereof, and can be and have been applied to the surfaces thereof, to provide threshold semiconductor devices wherein the control of the electric current is accomplished in the bulk of the solid state semiconductor materials.

In other instances, it has been found that the bodies

10 formed in the foregoing manner are in a crystalline like solid state, which may be a low resistance or conducting state or condition, probably due to the slow cooling of the semiconductor materials during the formation of the bodies. In these instances, it is necessary to change the bodies or the surfaces thereof to a disordered or generally amorphous state, and this may be accomplished in various ways, as for example: utilizing impure materials, adding impurities; including oxides in the bulk and/or in the surfaces or interfaces; mechanically by machining, sand blasting, impacting, bending, etching or subjecting to ultrasonic waves; metallurgically forming physical lattice deformations by heat treating and quick quenching or by high energy radiation with alpha, beta or gamma rays; chemically by means of oxygen, nitric or hydrofluoric acid, chlorine, sulphur, carbon, gold, nickel, iron or manganese inclusions, or ionic composition inclusions comprising alkali or alkaline earth metal compositions; electrically by electrical pulsing; or combinations thereof.

Where the entire bodies are changed in any of the foregoing manners to a disordered or generally amorphous solid state, base electrodes may be embedded therein during the formation of the bodies and the current control by such solid state current controlling devices would be in the bulk. Another manner of obtaining current control in the bulk is to embed in the bodies electrodes which, except for their tips, are provided with electrical insulation, such as an oxide of the electrode material. Current pulses are then applied to the electrodes to cause the effective semiconductor material between the uninsulated tips of the electrodes to assume the disordered or generally amorphous solid state.

The control of current by the threshold semiconductor devices can also be accomplished by surfaces or films of the semiconductor materials, particularly good results being here obtained. Here, the bodies of the semiconductor material, which are in a low resistance crystalline like solid state, may have their surfaces treated in the foregoing manners to provide surfaces or films which are in a disordered or generally amorphous solid state. Electrodes are suitably applied to the surfaces or films of such treated bodies, and since the bulk of the bodies is in the crystalline like solid state and the surfaces or films are in a disorganized or generally amorphous state (high resistance or substantially an insulator), the control of the current between the electrodes is mainly accomplished by the surfaces or films.

Instead of forming the complete body 10, the foregoing solid state semiconductor materials may be coated on a suitable smooth substrate, which may be a conductor or an insulator as by vacuum deposition or the like, to provide surfaces or films of the semiconductor material on the substrate, which surfaces or films are in a disordered or generally amorphous solid state (high resistance or substantially an insulator). The solid state semiconductor materials normally assume this state probably because of rapid cooling of the materials as they are deposited or they may be readily made to assume such state in the manners described above. Electrodes are suitably applied to the surfaces or films on the substrate and the control of the current is accomplished by the surfaces or films. If the substrate is a conductor, the control of the current is through the surfaces or films between the electrodes and the substrate, and, if desired, the substrate itself may form an electrode. If the substrate is an insulator itself, the control of the current is along the surfaces or films between the electrodes. A particularly satisfactory device which is extremely accurate and repeatable in production has been produced by vapor depositing on a smooth substrate a thin film of tellurium, arsenic and germanium and by applying tungsten electrodes, to the deposited film. The film may be formed by depositing these materials at the same time to provide a uniform and fixed film, or the film may be formed by depositing in sequence layers of tellurium, arsenic, germanium, arsenic and tellurium, and in the latter case, the deposited layers are then heated to a temperature below the sublimation point of the arsenic to unify and fix the film. The thickness of the surfaces or films, whether formed on the bodies by suitable treatment thereof or by deposition on substrates may be in a range up to a thickness of a few ten thousandths of an inch or even up to a thickness of a few hundredths of an inch or more.

The electrodes which are utilized in the threshold semiconductor devices of this invention may be substantially any good electrical conductor, preferably high melting point materials, such as tantalum, graphite, niobium tungsten and molybdenum. These electrodes are usually relatively inert with respect to the various aforementioned semiconductor materials.

The electrodes when not embedded in the bodies 10 in the instances discussed above, may be applied to the surfaces or films of the bodies, or the surfaces or films may be deposited on the substrates in any desired manner, as by mechanically pressing them in place, by fusing them in place, by soldering them in place, by vapor deposition or the like. Preferably, after the electrodes are applied, a pulse of voltage and current is applied to the devices for conditioning and fixing the electrical contact between the electrodes and the semiconductor materials. The current controlling devices may be encapsulated if desired.

It is believed that the generally amorphous polymeric like semiconductor materials have substantial current carrier restraining centers and a relatively large energy gap, that they have a relatively small mean free path for the current carriers, large spatial potential fluctuations and relatively few free current carriers due to the amorphous structure and the current carrier restraining centers therein for providing the high resistance or blocking state or condition. It is also believed that the crystalline like materials in their high resistance or blocking state or condition have substantial current carrier restraining centers, and have a relatively large mean free path for the current carriers due to the crystal lattice structure and hence a relatively high current carrier mobility but that there are relatively few free current carriers due to the substantial current carrier restraining centers therein, a relatively large energy gap therein, and large spatial potential fluctuations therein for providing the high resistance or blocking state or condition. It is further believed that the amorphous type semiconductor materials may have a higher resistance at the ordinary and usual temperatures of use, a greater non-linear negative temperature-resistance coefficient, a lower heat conductivity coefficient, and a greater change in electrical conductivity between the blocking state or condition and the conducting state or condition than the crystalline type of semiconductor materials, and thus be more suitable for many applications of this invention. By appropriate selection of materials and dimensions, the high resistance values may be predetermined and they may be made to run into millions of ohms, if desired.

As an electrical field is applied to the semiconductor materials (either the crystalline type or the amorphous type) of a device of this invention in its blocking state or condition, such as a voltage applied to the electrodes, the resistance of at least portions or paths of the semiconductor material between the electrodes decreases gradually and slowly as the applied field increases until such time as the applied field or voltage increases to a threshold value, whereupon said at least portions of the semiconductor material, at least one path between the electrodes, are substantially instantaneously changed to a low resistance or conducting state or condition for conducting current therethrough. It is believed that the applied threshold field or voltage causes firing or breakdown or "switching" of said at least portions or paths of the semiconductor material, and that the breakdown may be electrical or thermal or a combination of both, the electrical breakdown caused by the electrical field or voltage being more pronounced where the distance between the electrodes is small, as small as a fraction of a micron or so, and the thermal breakdown caused by the electrical field or voltage being more pronounced for greater distances between the electrodes. For some crystalline like materials the distances between the electrodes can be so small that barrier rectification and p-n junction operation are impossible due to the distances being beneath the transition length or barrier height. The "switching" time for switching from the blocking state to the conducting state are extremely short, less than a few micro-seconds.

The electrical breakdown may be due to rapid release, multiplication and conduction of current carriers in avalanche fashion under the influence of the applied electrical field or voltage, which may result from external field emission, internal field emission, impact or collision ionization from current carrier restraining centers (traps, recombination centers or the like), impact or collision ionization from valence bands, much like that occurring at breakdown in a gaseous discharge tube, or by lowering the height or decreasing the width of possible potential barriers and tunneling or the like may also be possible. It is believed that the local organization of the atoms and their spatial relationship in the crystal lattices in the crystalline type materials and the local organization and the spatial relationship between the atoms or small crystals or chain or ring segments in the amorphous type materials, at breakdown, are such as to provide at least a minimum mean free path for the current carriers released by the electrical field or voltage which is sufficient to allow adequate acceleration of the free current carriers by the applied electrical field or voltage to provide the impact or collision ionization and electrical breakdown. It is also believed that such a minimum mean free path for the current carriers may be inherently present in the amorphous structure and that the current conducting condition is greatly dependent upon the local organization for both the amorphous and crystalline conditions. As expressed above, a relatively large mean free path for the current carriers can be present in the crystalline structure.

The thermal breakdown may be due to Joule heating of said at least portions or paths of the semiconductor material by the applied electrical field or voltage, the semiconductor material having a substantial non-linear negative temperature-resistance coefficient and a minimal heat conductivity coefficient, and the resistance of said at least portions or paths of the semiconductor material rapidly decreasing upon such heating thereof. In this respect, it is believed that such decrease in resistance increases the current and rapidly heats by Joule heating said at least portions or paths of the semiconductor material to thermally release the current carriers to be accelerated in the mean free path by the applied electrical field or voltage to provide for rapid release, multiplication and conduction of current carriers in avalanche fashion and, hence, breakdown, and, especially in the amorphous condition, the overlapping of orbitals by virtue of the type of local organization can create different sub-bands in the band structure.

It is also believed that the current so initiated between the electrodes at breakdown (electrically, thermally or both) causes at least portions or paths of the semiconductor material between the electrodes to be substantially instantaneously heated by Joule heat, that at such increased temperatures and under the influence of the electrical field or voltage, further current carriers are released, multiplied and conducted in avalanche fashion to provide high current density, and a low resistance or conducting state or condition which remains at a greatly reduced applied voltage. It is possible that the increase in mobility of the current carriers at high temperatures and higher electric field strengths is due to the fact tha the current carriers being excited to higher energy states populate bands of lower effective mass and, hence, higher mobility than at lower temperatures and electric field strengths. The possibility for tunneling increases with lower effective mass and higher mobility. It is also possible that a space charge can be established due to the possibility of the current carriers having different masses and mobilities and since an inhomogeneous electric field could be established which would continuously elevate current carriers from one mobility to another in a regenerative fashion. As the current densities of the devices decrease, the current carrier mobilities decrease and, therefore, their capture possibilities increase. In the conducting state or condition the current carriers would be more energetic than their surroundings and would be considered as being hot. It is not clear at what point the minority carriers present could have an influence on the conducting process, but there is a possibility that they may enter and dominate, i.e. become majority carriers at certain critical levels.

It is further believed that the amount of increase in the mean free path for the current carriers in the amorphous like semiconductor material and the increased current carrier mobility are dependent upon the amount of increase in temperature and field strength, and it is possible that said at least portions or paths of some of the amorphous like semiconductor materials are electrically activated and heated to at least a critical transition temperature, such as a glass transition temperature, where softening begins to take place. Thus, due to such increase in mean free path for the current carriers, the current carriers produced and released by the applied electrical field or voltage are rapidly released, multiplied and conducted in avalanche fashion under the influence of the applied electrical field or voltage to provide and maintain a low resistance or conducting state or condition.

The voltage across the device in its low resistance or conducting state or condition remains substantially constant although the current may increase and decrease greatly. In this connection, it is believed that the conducting filaments or threads or paths between the electrodes increase and decrease in cross section as the current increases and decreases for providing the substantially constant voltage condition while conducting. When the current through said at least portions or paths of the semiconductor material decreases to a minimum current holding value which is near zero, it is believed that there is insufficient current to maintain the same in their low resistance or conducting state or condition, whereupon they substantially instantaneously change or revert to their high resistance or blocking state or condition. In other words, the conducting filaments or threads or paths between the electrodes are interrupted when this condition occurs. The decrease in current below the minimum current holding value may be brought about by decreasing the applied voltage to a low value. Said at least portions or paths of the semiconductor material may again be substantially instantaneously changed to their low resistance or conducting state or condition where they are again activated by the voltage applied thereto. The ratio of the blocking resistance to the resistance in the conducting state or condition is extremely high, as for example, larger than 100,000:1. In its low resistance or conducting state or condition the resistance may be as low as 1 ohm or less as determined by the small voltage drop thereacross and the holding current for the device may be near zero.

Referring to FIGS. 2 and 2A showing waveforms of voltage and current in the circuit of FIG. 1, it can be seen that during the first half cycle after connection of the voltage source into the circuit when the output E1 of the source of voltage 16 first reaches an upper threshold voltage level, the current I1 (FIG. 2A) will rise from zero and continue to follow the sinusoidal waveform of the applied voltage until a point near zero where the current goes below a given holding current level where the device 2 reverts temporarily to a blocking state. In each succeeding half cycle, the device usually resumes conduction at a point in time earlier than the point in time when the applied voltage reaches the upper threshold level, at a voltage level referred to as a lower threshold voltage level. The lower threshold voltage level can be made substantially below the upper threshold voltage level, especially where the active semiconductor material has any appreciable thickness where heat dissipation is less than ideal. However, other factors than temperature could also possibly be responsible for the presence of a lower threshold voltage level. The semiconductor device is considered to be in its conducting state or condition despite its momentary return to the high resistance state or condition each half cycle. However, when the peak value of the A.C. voltage is decreased below the lower threshold voltage level, the low resistance state or condition does not resume each half cycle and the device is then considered to be in a blocking state or condition. After the device becomes non-conducting, it cannot again become conducting until the peak voltage of the applied A.C. voltage becomes at least as great as the upper threshold voltage level.

Refer to FIG. 2B illustrating the current-voltage characteristic of the threshold semiconductor device 2 for the positive and negative going half cycles of the applied A.C. voltage. It should be noted that device 2 starts to conduct appreciable current when the instantaneous value of the applied voltages reaches the threshold level involved. The voltage across the device then suddenly reduces to a very low value identified by the vertical portions 17 of the curve which are slightly off-set from the zero voltage center point and represent the small resistance of the device 2 and the small and substantially constant voltage drop thereacross in its low resistance or conducting state or condition. In this condition there is a constant ratio of voltage change to current change in the device 2, the voltage drop thereacross is a minor fraction of the voltage drop across the active semiconductive material of the device in the blocking condition thereof, and the low voltage drop thereacross in the conducting condition of the device is the same for increase and decrease in the instantaneous current above the minimum current holding value. It should also be noted from FIG. 2B that the device momentarily assumes its high resistance or blocking state or condition each half cycle of the applied A.C. voltage as the instantaneous current drops below the minimum current holding value. However, following each momentary half cycle interruption of the current flow, the low resistance state or condition of the semiconductor device resumes the next half cycle when the instantaneous value of the applied A.C. voltage reaches the applicable threshold voltage level.

Figure 3:
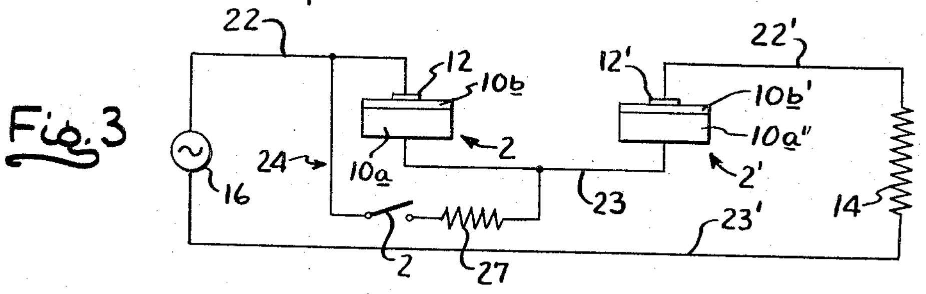
FIG. 3 illustrates one form of power switching system of the present invention utilizing a pair of two-terminal threshold semiconductor devices and a control circuit designed to control the operation of the threshold semiconductor devices by the opening or closing of a switch.

Refer now to FIG. 3 which illustrates one form of the present invention. As there shown, a pair of two-terminal threshold semiconductor devices 2–2' are connected in a series between a source of A.C. sinusoidal voltage 16 having an output with an RMS value of 110 volts (peak value 155 volts) and a load 14. As illustrated, each threshold semiconductor device comprises a continuously conducting body portion **10*a* of metal or the like or an inactive and conductive semiconductor material and an active semiconductor layer or film 10*b* which may be made by vacuum depositing the layer or film on the body portion in the manner described above. Each semiconductor layer 10*b* has an electrode 12 thereon constituting one of the terminals of the associated device. The other terminal of each device may comprise the conductive body portion 10*a*. The body portions 10*a*–10*a'* of the devices 2–2' are electrically connected together by a conductor 23, and the terminals 12–12' thereof are respectively connected by conductors 22–22' to a terminal of the source of A.C. voltage 16 and an end of the load 14. The other end of the load 14 and the other terminal of the source of A.C. voltage 16 are connected by a conductor 23'. It is assumed that each of the threshold semiconductor devices has an upper peak threshold voltage level of 90 volts (RMS value of 63.6 volts) and a lower peak threshold voltage level of 86 volts (RMS value of 59.6 volts). It is thus apparent that the output of the source of A.C. voltage 16 is insufficient to fire the devices 2–2′ by itself since it does not exceed the sum of the upper threshold voltage levels of the layers 10*b*–10*b*′ of semiconductor material of the threshold semiconductor devices 2–2′**. However, the output of the source of A.C. voltage is well in excess of the upper threshold voltage level of each layer considered singly.

In accordance with one aspect of the invention, a control circuit 24 is connected between one of the terminals 12 of one of the devices 2–2′ and the common conductor 23 interconnecting the body portions **10*a*–10*a*′ thereof so that the layer 10*b* of the device 2 is connected in parallel with the control circuit 24 and the layer 10*b*′ of the device 2′ is connected in series with the control circuit. The control circuit 24 shown in FIG. 3 has a normally open switch 25 in series with a resistor 27. The value of the resistor 27 is smaller than the blocking impedance of the layer 10*b* of the parallel connected device 2 but is substantially greater than the conducting impedance of the layer 10*b* so that upon conduction of the device 2 the control circuit will draw little or no current. Initially, when the devices 2–2′ are in their blocking states or conditions and the switch 25 is closed, the voltage drop across resistor 27 will be substantially less than half the output of the source of applied voltage (the impedance of the load 14 is assumed to be so small that it can be neglected) so that the voltage applied across the terminals of the series connected device 2′ is sufficient to drive the semiconductor layer 10*b*′ to its conductive state or condition. The impedance of resistor 27 is so great that little current flows through the control circuit, and substantially immediately after firing of the device 2′ the device 2 will become conductive because substantially the entire output of the voltage source 16 then will appear across the resistor 27. As previously indicated, the semiconductor layers 10*b* and 10*b*′ of the devices 2–2′ will revert to their blocking states or conditions each half cycle as the current therethrough drops to a very low value near zero. Conduction thereof resumes at some point during the next half cycle if the voltage conditions of the circuit permit it. Upon opening of the switch 25, the momentary blocking states or conditions of the devices 2–2′ will revert to continuous blocking stated or condition because the opening of the switch 25 effectively decouples the output of source of the voltage 16 from the series connected device 2′, and blocking of the device 2′ with an open control circuit reduces the voltage across the terminals of the device 2** below the lower threshold voltage level thereof.

Figure 4:
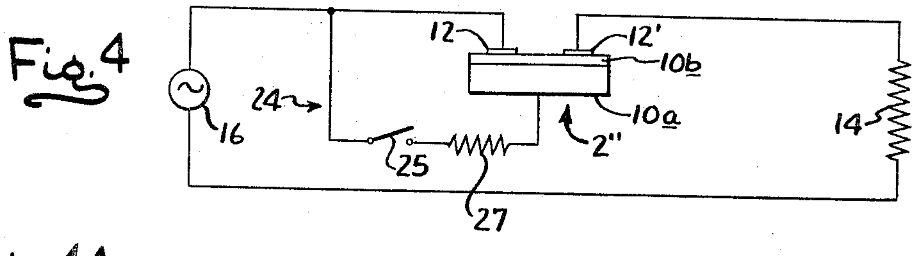
FIG. 4 shows a circuit similar to that shown in FIG. 3 utilizing a single three-terminal threshold semiconductor device.

The threshold semiconductor devices 2 and 2′ may be replaced by a single threshold semiconductor device generally identified by reference numerals 2″ in FIG. 4. As there shown, the semiconductor device 2″ has only one layer **10*b* of semiconductor material overlying a conductive body portion 10*a*. The outer surface of the layer 10*b* has a pair of spaced electrodes 12 and 12′, thereon which correspond in function to the electrodes 12 and 12′, in the device 2–2′ of the embodiment of FIG. 3 and so are connected between the source of A.C. voltage 16 and the load 14. The control circuit comprising the switch 25 and the resistor 27 are connected between one of the electrodes 12 and the body portion 10*a* which forms a common terminal for the two sections of the layer 10*b* adjacent the electrodes 12–12′ which act like separate layers of semiconductor material connected in series. Thus, the load current flows through the device 2″ in series paths including the path comprising one of the electrodes 12, the adjacent section of the layer 10*b* and the body portion 10*a*, and the path comprising the body portion 10*a* the section of the layer 10*b* opposite the electrode 12 and the electrode 12′**.

Figure 4A:
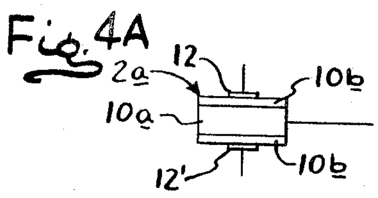
FIG. 4A illustrates another physical form of a three-terminal threshold semiconductor device.

FIG. 4A shows another physical form of a three-terminal threshold semiconductor device **2*a* which can be substituted for the device 2″ shown in FIG. 4. As there shown, the device 2*a* has a conductive body portion 10*a* and semiconductor layers 10*b*–10*b*′ on opposite sides thereof. The electrodes 12–12′ are respectively applied to the outer surfaces of the layers 10*b*–10*b*′. The electrodes 12–12′ are connected respectively to the source of A.C. voltage 16 and the load 14 and the body portion 10*a* between the layers 10*b*–10*b*′ act as the control terminal of the threshold semiconductor device as in the device 2″** in FIG. 4.

Figure 5:
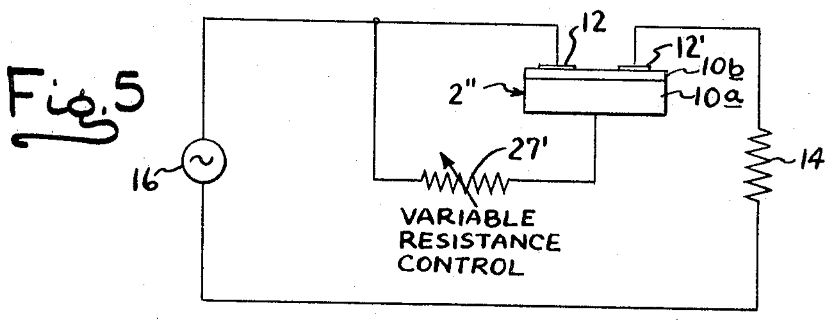
FIG. 5 shows another form of the invention wherein control over conduction of a single three-terminal threshold semiconductor device is effected through a variable responsive resistance.

Refer now to FIG. 5 which shows an embodiment of the present invention for controlling the limits of a variable whose value is increased or decreased by energization of the load 14 (which may be a heating coil, cooling compressor motor, humidifier or dehumidifier motor, or a relay coil for controlling the same). The control circuit of this embodiment of the invention includes a variable responsive resistor 27′ which controls the conduction of the semiconductor sections or layers **10*b*–10*b*′ of a threshold semiconductor device 2″. Where energization of the load 14 will result in an increase in the value of the variable, the resistor 27′ must have a positive coefficient, and where energization of the load 14 will result in a decrease in the value of the variable involved, the resistor 27′ must have a negative coefficient. In this form of the invention it is usually desirable that the upper and lower threshold voltage levels of the device 2″** be as close together as possible.

As in the case of the embodiment of the invention shown in FIGS. 3 and 4, the control circuit resistor 27′ has most advantageously at all times a value greatly in excess of the conducting impedance of the layer or section of semiconductor material connected in parallel with the control circuit so that upon conduction thereof little or no load current will flow in the control circuit. (It is assumed, as is usually the case, that the load impedance is negligible relative to the blocking impedance of the device 2″ and the control circuit resistor 27′.) As indicated in describing the embodiment of FIG. 4, to initiate conduction of the two sections or layers of semiconductor material of the device 2″, the resistor 27′ must have a value sufficiently below the blocking impedance of the parallel connected section or layer of semiconductor material that the voltage division between the resistor 27′ and the series connected section or layer of semiconductor material places the voltage across the latter section or layer above the upper threshold level thereof.

Assuming that the source of applied voltage 16 has a peak value of 155 volts (RMS value of 110 volts) and the peak upper threshold voltage level of each of the sections or layers of the threshold semiconductor device 2″ is 90 volts (RMS value of about 64 volts), if the blocking impedance of each section or layer of semiconductor material is one megohm, the series connected section or layer will have a voltage thereacross of 90 volts when the resistor 27′ has a value of 720,000 ohms. (It is assumed in the example being described that the composition of the semiconductor layer of the device 2″ is such that the blocking impedance and threshold levels thereof do not vary much with the environmental conditions, or, less desirably, these conditions are fixed.) When the series connected section or layer of semiconductor material becomes conductive, substantially the entire applied voltage will appear across the control circuit resistor and the parallel section or layer of semiconductor material to drive the same into its conducting state. The resultant energization of the load 14 results in a variation in the value of the variable involved which increases the value of the resistor 27′. As the resistor 27′ increases in value, it is believed that the angle of conduction of the threshold semiconductor device 2″ will gradually decrease toward 90 degrees where the device reverts to a continuous blocking state or condition. The change in the value of the resistor 27′ necessary to render the device nonconductive depends, at least in part, if not entirely, upon the lower threshold level of the sections or layers of semiconductor material. The closer together are the threshold levels thereof, the smaller is the change in the value of the resistor 27″ between the conductive and non-conductive states or conditions of the threshold semiconductor device 2″ and the closer are the upper and lower limits of the variable being controlled. Also, for maximum control by the resistor 27′ the semiconductor material preferably operates in a mode where, upon initial conduction of the semiconductor sections or layers, the conduction angle thereof each half cycle is substantially less than 180 degrees, that is, as close to 90 degrees as possible.

Figure 6:
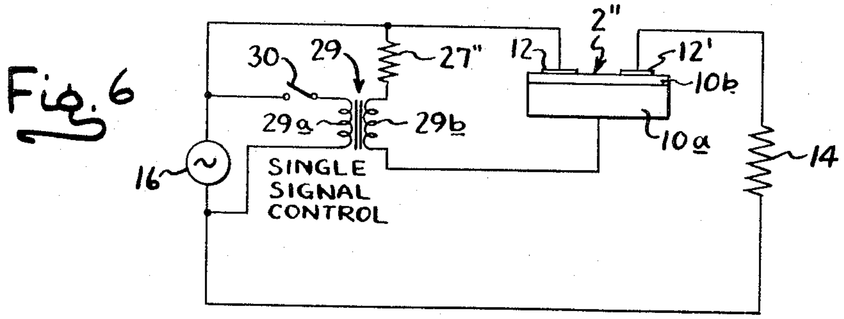
FIG. 6 shows a modification of the power switching system, of FIG. 4 wherein control over the conduction of the single three-terminal threshold semiconductor device is obtained through a single control signal.

Refer now to the embodiment of the invention shown in FIG. 6 which illustrates another form of the invention wherein control over conduction of the threshold semiconductor device 2″ is carried out by selectively controlling the presence or absence of a single control voltage in the control circuit. The control circuit in this form of the invention includes a resistor 27″ in series with a secondary winding 29*b* of a transformer 29. It is assumed that the value of the resistor 27″ is sufficiently large that, in the absence of a control voltage induced in the winding 29*b*, the voltage applied to the series connected section or layer of semiconductor material between the electrode 12′ and the body portion 10*a* is below the upper and lower threshold voltage levels thereof and is sufficiently small that the voltage drop thereacross is below the upper threshold level of the parallel connected section or layer between electrode 12 and the body portion 10*a*. When it is desired to effect conduction of the threshold semiconductor device 2″, a switch 30 in series with the primary winding 29*a* of the transformer is closed to induce a voltage in the secondary winding 29*b* of the transformer 29 which is in additive relation to the output of the source of applied voltage 16 to raise the voltage across the series connected section or layer of semiconductor material to or above the upper threshold level thereof. (The primary winding 29*a* of the transformer 29 may be fed from the output of the voltage source 16.) When this section or layer of the device is driven into its conductive state or condition, the voltage across resistor 27″ with or without the voltage induced into the secondary winding 29*b* will be sufficient to drive the parallel connected section or layer semiconductor material into its conductive state or condition. Upon removal of the voltage in the secondary winding 29*b*, the threshold semiconductor device 2″ will revert to its blocking state or condition because it is assumed that the value of resistor 27″ is so large as to render the conducting series connected section or layer of semiconductor material non-conductive.

Figure 7:
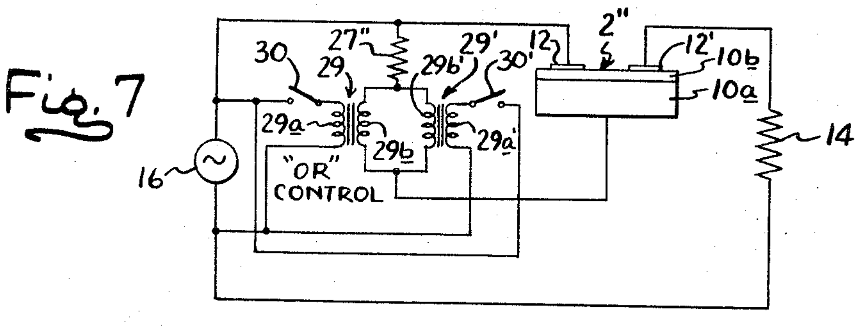
FIG. 7 shows a modification of the power switching system of FIG. 6 where control over the conduction of the threshold semiconductor device is obtained through two voltage sources connected as an "OR" circuit.

Refer, now to FIG. 7 which illustrates a modified form of the invention shown in FIG. 6 where a pair of voltage sources connected into an "OR" circuit is utilized to control the conductive state or condition of the threshold semiconductor device 2″. As illustrated, the control resistor 27″ is connected in series with a parallel circuit comprising the secondary winding 29*b* of a transformer 29 and the secondary winding 29*b*′ of a transformer 29′. The primary windings 29*a* and 29*a*′ of these transformers extend through switches 30–30′ controlled by variables which are to establish the "OR" function involved to a suitable source of control voltage such as the output of the voltage source 16. When either switch 30 or 30′ is closed, a voltage is induced in the secondary winding 29*b* or 29*b*′ to render the threshold semiconductor device 2″ conductive in the same manner described, and when switches 30 and 30′ are opened, the device 2″ is rendered non-conductive.

Figure 8:
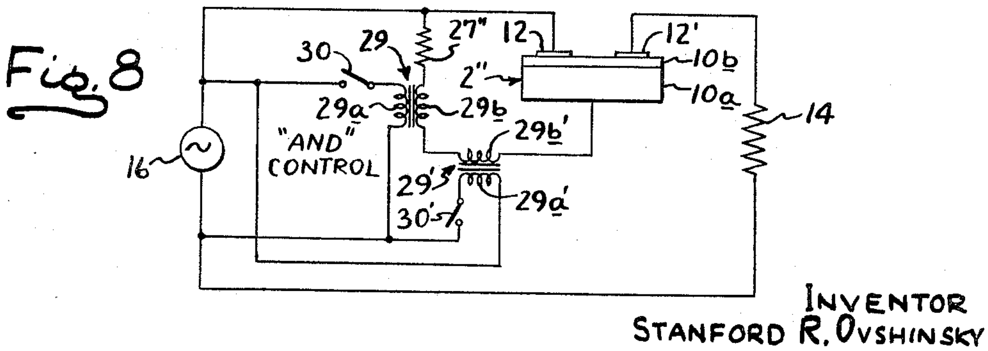
FIG. 8 is a modification of the power switching system of FIG. 6 where control over the conduction of the threshold semiconductor device is effected by means of two voltage sources connected to an "AND" circuit.

Referring now to the embodiment of the invention shown in FIG. 8 wherein the secondary windings of transformers 29 and 29′ are connected to form an "AND" logic circuit. In such case, the secondary windings 29*b* and 29*b*′ of transformers 29 and 29′ are connected in series with the resistor 27″ and the voltage induced in each of the secondary windings is one half that induced into the secondary windings in the embodiment of the invention shown in FIGS. 6 and 7. Thus, upon closure of both variable responsive switches 30 and 30′ voltages will be induced into both secondary windings 29*b* and 29*b*′ to effect conduction of the threshold semiconductor device 2″.

It should be understood that numerous modifications may be made in the preferred forms of the invention described above without deviating from the broader aspects thereof.

What is claimed is:

1. In an A.C. circuit including a source of A.C. voltage and a load to be supplied with current from said source of A.C. voltage, bi-directional threshold semiconductor switch means for controlling the flow of current between said source of A.C. voltage and the load, said semiconductor switch means having a pair of main load terminals connecting the same between said voltage source and load and two sections of semiconductor material having their outermost portions connected to said main load terminals and their innermost portions electrically joined by means forming intermediate terminal means wherein said sections of semiconductor material act as serially connected layers of semiconductor material through which common load current may flow, each of said sections of semiconductor material comprising semiconductor material having one state wherein at least portions thereof between the associated load terminal and intermediate terminal means are in one condition which is of high resistance and substantially an insulator for blocking the flow of current therethrough in either or both directions when the peak value of an A.C. voltage applied to the associated terminals is below a threshold voltage level, and being driven into another state wherein said at least portions thereof between the associated terminals are in another condition which is of low resistance and substantially a conductor for conducting the flow of current therethrough in either or both directions when the peak value of the A.C. voltage applied to the associated terminals is raised above said threshold voltage level and revert to said blocking condition when the current flow therethrough is reduced below a given holding level, the peak value of the output of said source of A.C. voltage being less than the sum of the threshold voltage levels of both of said sections of semiconductor material, and means for controlling the states of said sections of semiconductor material, which means includes a control circuit extending between one of said main load terminals and said intermediate terminal means wherein one of said semiconductor sections is in parallel and the other semiconductor section is in series with the control circuit, and said control circuit including control means for providing a first condition of said control circuit where the voltage applied across the terminals of the series connected section of semiconductor material exceeds the threshold voltage level thereof to first drive the same to said conducting condition which modifies the voltage conditions of the circuit immediately to apply across the terminals of the parallel connected section of semiconductor material a voltage which exceeds the threshold voltage level thereof to drive the same to said conducting condition, and a second condition of the control circuit where the voltage across the terminals of the series connected section of semiconductor material is insufficient to maintain the conducting condition thereof and, after reverting to said blocking condition terminates conduction of the parallel connected section of semiconductor material.

2. The circuit of claim 1 wherein said sections of semiconductor material are respectively located in a pair of two-terminal threshold semiconductor devices each having a pair of load terminals, one of the terminals of each device constituting said main load terminals and the other terminals of said devices being electrically interconnected to form said intermediate terminal means.

3. The circuit of claim 1 wherein said threshold semiconductor switch means is a single three-terminal device where the sections of semiconductor material are formed into a single integral body where one of the terminals constitutes said intermediate terminal means and connects the conductive paths of the sections in series and the other two terminals constituting said main load terminals.

4. The circuit of claim 1 wherein the output of said source of A.C. voltage has a value in excess of the threshold voltage level of each of said sections of semiconductor material, and said control circuit is a variable impedance circuit wherein in said first condition it has a relatively low impedance where the impedance value is still substantially greater than the conducting impedance of said parallel connected section of semiconductor material so that normal load current does not flow therethrough but is sufficiently small that the A.C. voltage coupled thereby to the series connected section of semiconductor material exceeds the threshold voltage level thereof to drive the same into its conducting condition, and, upon conduction of the latter section of semiconductor material, develops an A.C. voltage drop in the control circuit which exceeds the threshold voltage level of the parallel connected section of semiconductor material, and said control circuit in said second condition having a relatively large impedance which terminates conduction of said series connected section which, upon reverting to its blocking condition, terminates conduction of the series connected section of semiconductor material.

5. The circuit of claim 4 wherein said control circuit includes an impedance having said low impedance value and said control means being a switch which selectively opens and closes the control circuit.

6. The circuit of claim 4 wherein said control circuit includes a variable responsive impedance with a positive coefficient, said load comprises a variable control means which increases the value of the variable when energized from said source of A.C. voltage, said variable responsive impedance decreasing to said low impedance when the variable drops to a low control level to initiate the conduction of said sections of semiconductor material and increasing to said large impedance when the variable rises to an upper control level to stop conduction of said sections of semiconductor material.

7. The circuit of claim 4 wherein said control circuit includes a variable responsive impedance with a negative coefficient, said load comprises a variable control means which decreases the value of the variable when energized from said source of A.C. voltage, said variable responsive impedance decreasing to said low impedance when the variable increases to an upper control level to initiate the conduction of said sections of semiconductor material, and increasing to said large impedance when the variable drops to a lower control level to stop conduction of said sections of semiconductor material.

8. The circuit of claim 1 wherein said control circuit includes an impedance of such a large value that the voltage coupled thereby to the series connected section of semiconductor material is below the threshold voltage level thereof and the parallel connected section of semiconductor material when in its conducting condition carries substantially all the load current, said control circuit further including control voltage means in series with said impedance for selectively providing at least one A.C. control voltage for raising the voltage coupled to the series connected section of semiconductor material to said threshold voltage level, and, wherein after said series connected section of semiconductor material is in its conducting condition the control voltage in the control circuit is above the upper threshold voltage level of the parallel connected section of semiconductor material to drive the same into its conducting condition, said sections of semiconductor material reverting to their blocking conditions upon disappearance of the control voltage.

9. The circuit of claim 8 wherein said control voltage means is an "OR" circuit comprising at leat two A.C. voltage sources connected in parallel and each capable of raising the A.C. voltage across the series connected section of semiconductor material at least to the threshold voltage level thereof to drive the same into said conducting condition.

10. The circuit of claim 8 wherein said control voltage means is an "AND" circuit comprising two series connected A.C. voltage sources which together raise the A.C. voltage across the series connected section of semiconductor material at least to the threshold voltage level thereof to drive the same into said conducting condition.

11. In an A.C. circuit including a source of A.C. voltage and a load to be supplied with current from said source of A.C. voltage, bi-directional threshold semiconductor switch means for controlling the flow of current between said source of A.C. voltage and the load, said semiconductor switch means having a pair of main load terminals connecting the same between said voltage source and load and two sections of semiconductor material having their outermost portions connected to said main load terminals and their innermost portions electrically joined by means forming intermediate terminal means wherein said sections of semiconductor material act as serially connected layers of semiconductor material through which common load current may flow, each of said sections of semiconductor material means with the associated main load terminal and intermediate terminal means being in non-rectifying contact therewith, said semiconductor material means being of one conducting type and including means for providing a first condition of relatively high resistance for substantially blocking A.C. current therethrough between the load terminals substantially equally in both half cycles of the A.C. current, said semiconductor material means including means responsive to the instantaneous value of an A.C. voltage thereacross of at least a given threshold voltage level applied thereacross for altering said first condition of relatively high resistance of said semiconductor material means for substantially immediately providing at least one path through said semiconductor material means between the load terminals having a second condition of relatively low resistance for conducting the A.C. current therethrough substantially equally in each half cycle of the A.C. current, said semiconductor material means including means for maintaining said at least one path of said semiconductor material means in its said second relatively low resistance conducting condition for conducting current between the load terminals substantially equally in each half cycle of the A.C. current, said semiconductor material means including means responsive to a decrease in the instantaneous current, through said at least one path in its said relatively low resistance conducting condition, to a value below said minimum instantaneous current holding value in each half cycle of the A.C. current for immediately causing realtering of said second relatively low resistance conducting condition of said at least one path to said first relatively high resistance blocking condition in each half cycle of the A.C. current for substantially blocking the A.C. current therethrough substantially equally in each half cycle of the A.C. current, the peak value of the output of said source of A.C. voltage being less than the sum of the threshold voltage levels of both of said sections of semiconductor material, and means for controlling the states of said sections of semiconductor material, which means includes a control circuit extending between one of said main load terminals and said intermediate terminal means wherein one of said semiconductor sections is in parallel and the other semiconductor section is in series with the control circuit, and said control circuit including control means for providing a first condition of said control circuit where the voltage applied across the terminals of the series connected section of semiconductor material exceeds the threshold voltage level thereof to first drive the same to said conducting condition which modifies the voltage conditions of the circuit immediately to apply across the terminals of the parallel connected section of semiconductor material a voltage which exceeds the threshold voltage level thereof to drive the same to said conducting condition, and a second condition of the control circuit where the voltage across the terminals of the series connected section of semiconductor material is insufficient to maintain the conducting condition thereof and, after reverting to said blocking condition terminates conduction of the parallel connected section of semiconductor material.

12. The circuit of claim 11 wherein said threshold semiconductor switch means is a single three-terminal device where the sections of semiconductor material are formed into a single integral body where one of the terminals constitutes said intermediate terminal means and connects the conductive paths of the sections in series and the other two terminals constituting said main load terminals.

13. The circuit of claim 11 wherein the output of said source of A.C. voltage has a value in excess of the threshold voltage level of each of said sections of semiconductor material, and said control circuit is a variable impedance circuit wherein in said first condition it has a relatively low impedance where the impedance value is still substantially greater than the conducting impedance of said parallel connected section of semiconductor material so that normal load current does not flow therethrough but is sufficiently small that the A.C. voltage coupled thereby to the series connected section of semiconductor material exceeds the threshold voltage level thereof to drive the same into its conducting condition, and, upon conduction of the latter section of semiconductor material, develops an A.C. voltage drop in the central circuit which exceeds the threshold voltage level of the parallel connected section of semiconductor material, and said control circuit in said second condition having a relatively large impedance which terminates conduction of said series connected section which, upon reverting to its blocking condition, terminates conduction of the series connected section of semiconductor material.

14. In an A.C. circuit including a source of A.C. voltage and a load to be supplied with current from said source of A.C. voltage, bi-directional threshold semiconductor switch means for controlling the flow of current between said source of A.C. voltage and the load, said semiconductor switch means having a pair of main load terminals connecting the same between said voltage source and load and two sections of semiconductor material having their outermost portions connected to said main load terminals and their innermost portions electrically joined by means forming intermediate terminal means wherein said sections of semiconductor material act as serially connected layers of semiconductor material through which common load current may flow, each of said sections of semiconductor material means with the associated main load terminal and intermediate terminal means in non-rectifying contact therewith, said semiconductor material means being of one conducting type and including means for providing a first condition of relatively high resistance for substantially blocking A.C. current therethrough between the load terminals substantially equally in both half cycles of the A.C. current, said semiconductor material means including means responsive to the instantaneous value of an A.C. voltage thereacross of at least a given threshold voltage level applied thereacross for altering said first condition of relatively high resistance of said semiconductor material means for substantially immediately, providing at least one path, through said semiconductor material means between the load terminals having a second condition of relatively low resistance for conducting the A.C. current therethrough substantially equally in each half cycle of the A.C. current, said semiconductor material means including means for maintaining said at least one path of said semiconductor material means in its said second relatively low resistance conducting condition and providing a substantially constant ratio of voltage change to current change for conducting current at a substantially constant voltage therethrough between the load terminals substantially equally in each half cycle of the A.C. current which voltage is the same for increase and decrease in the instantaneous current above a minimum instantaneous current holding value, and providing a voltage drop across said at least one path in its said second relatively low resistance conducting condition which is a minor fraction of the voltage drop across said semiconductor material means in its said first relatively high resistance blocking condition near said threshold voltage level, said semiconductor material means including means responsive to a decrease in the instantaneous current, through said at least one path in its said relatively low resistance conducting condition, to a value below said minimum instantaneous current holding value in each half cycle of the A.C. current for immediately causing realtering of said second relatively low resistance conducting condition of said at least one path to said first relatively high resistance blocking condition in each half cycle of the A.C. current for substantially blocking the A.C. current therethrough substantially equally in each half cycle of the A.C. current, the peak value of the output of said source of A.C. voltage being less than the sum of the threshold voltage levels of both of said sections of semiconductor material, and means for controlling the states of said sections of semiconductor material, which means includes a control circuit extending between one of said main load terminals and said intermediate terminal means wherein one of said semiconductor sections is in parallel and the other semiconductor section is in series with the control circuit, and said control circuit including control means for providing a first condition of said control circuit where the voltage applied across the terminals of the series connected sections of semiconductor material exceeds the threshold voltage level thereof to first drive the same to said conducting condition which modifies the voltage conditions of the circuit immediately to apply across the terminals of the parallel connected section of semiconductor material a voltage which exceeds the threshold voltage level thereof to drive the same to said conducting condition, and a second condition of the control circuit where the voltage across the terminals of the series connected section of semiconductor material is insufficient to maintain the conducting condition thereof and, after reverting to said blocking condition terminates conduction of the parallel connected section of semiconductor material.

15. The circuit of claim 14 wherein said threshold semiconductor switch means is a single three-terminal device where the sections of semiconductor material are formed into a single integral body where one of the terminals constitutes said intermediate terminal means and connects the conductive paths of the sections in series and the other two terminals constituting said main load terminals.

16. The circuit of claim 14 wherein the output of said source of A.C. voltage has a value in excess of the threshold voltage level of each of said sections of semiconductor material, and said control circuit is a variable impedance circuit wherein in said first condition it has a relatively low impedance where the impedance value is still substantially greater than the conducting impedance of said parallel connected section of semiconductor material so that normal load current does not flow therethrough but is sufficiently small that the A.C. voltage coupled thereby to the series connected section of semiconductor material exceeds the threshold voltage level thereof to drive the same into its conducting condition, and, upon conduction of the latter section of semiconductor material, develops an A.C. voltage drop in the control circuit which exceeds the threshold voltage level of the parallel connected section of semiconductor material, and said control circuit in said second condition having a relatively large impedance which terminates conduction of said series connected section which, upon reverting to its blocking condition, terminates conduction of the series connected section of semiconductor material.

No references cited.

ARTHUR GAUSS, *Primary Examiner.*

J. BUSCH, *Assistant Examiner.*